US009799428B2

(12) United States Patent
Wieneke

(10) Patent No.: US 9,799,428 B2
(45) Date of Patent: Oct. 24, 2017

(54) CONDUCTOR MARKER

(71) Applicant: Weidmueller Interface GmbH & Co. KG, Detmold (DE)

(72) Inventor: Andreas Wieneke, Lemgo (DE)

(73) Assignee: Weidmüller Interface GmbH & Co. KG (DE)

( * ) Notice: Subject to any disclaimer, the term of this patent is extended or adjusted under 35 U.S.C. 154(b) by 0 days.

(21) Appl. No.: 14/785,773

(22) PCT Filed: Apr. 23, 2014

(86) PCT No.: PCT/EP2014/058189
§ 371 (c)(1),
(2) Date: Oct. 20, 2015

(87) PCT Pub. No.: WO2014/173926
PCT Pub. Date: Oct. 30, 2014

(65) Prior Publication Data

US 2016/0078984 A1 Mar. 17, 2016

(30) Foreign Application Priority Data

Apr. 25, 2013 (DE) .................... 20 2013 101 786 U

(51) Int. Cl.
*H01R 9/05* (2006.01)
*H01B 7/36* (2006.01)
(Continued)

(52) U.S. Cl.
CPC ........... *H01B 7/368* (2013.01); *G09F 3/0295* (2013.01); *G09F 3/06* (2013.01); *G09F 3/16* (2013.01); *G09F 3/20* (2013.01); *G09F 3/205* (2013.01)

(58) Field of Classification Search
CPC .. H01B 7/00; H01B 7/368; G09F 3/00; G09F 3/66; G09F 3/16; G09F 3/20; G09F 3/205
(Continued)

(56) References Cited

U.S. PATENT DOCUMENTS 3,846,725 A * 11/1974 Mears, Jr. ............... H01F 17/04
174/138 F
4,637,097 A * 1/1987 Secord .................. F16B 7/0433
24/16 PB
(Continued)

FOREIGN PATENT DOCUMENTS

DE 101 14 890 A1 10/2002
DE 20 2008 004 596 U1 9/2009
(Continued)

*Primary Examiner* — William H Mayo, III
(74) *Attorney, Agent, or Firm* — Laubscher, Spendlove & Laubscher, P.C.

(57) ABSTRACT

A connector marker for identifying an electrical conductor includes a marker body formed of a synthetic plastic material and a pair of generally planar half sections normally arranged in an initial open condition in horizontal coplanar side-by-side relation. At least one of the half sections has an upper surface carrying labeling indicia. At least one integral film hinge device connects the adjacent side edges of the half sections, thereby to afford pivotal displacement of the half sections about a given pivot axis from the open condition toward a closed condition enclosing the electrical conductor to be marked. At least one non-skid element extends from the hinge device for non-skid engagement with the outer peripheral surface of the conductor as the half sections are pivotally displaced from the open condition to the closed condition, thereby to prevent longitudinal slipping of the marker body relative to the conductor.

13 Claims, 13 Drawing Sheets

(51) Int. Cl.

| | |
|---|---|
| ***G09F 3/06*** | (2006.01) |
| ***G09F 3/20*** | (2006.01) |
| ***G09F 3/16*** | (2006.01) |
| ***G09F 3/00*** | (2006.01) |

(58) Field of Classification Search

USPC .............................. 174/36, 112, 92, 93, 94 S

See application file for complete search history.

(56) References Cited

U.S. PATENT DOCUMENTS 4,963,700 A * 10/1990 Olsen ..................... H02G 15/18 174/138 F 5,115,586 A * 5/1992 Hawker ............... G02B 6/4482 40/316

5,198,619 A * 3/1993 Baker .................. H02G 15/046 174/74 A 5,796,041 A * 8/1998 Suzuki ................... H02G 15/18 174/92

6,359,228 B1 * 3/2002 Strause ................ G02B 6/4446 174/41

6,777,618 B2 * 8/2004 Bond ...................... G09F 3/205 174/112

6,843,008 B2 * 1/2005 Mellgren ................ G09F 3/205 174/112

7,612,288 B1 * 11/2009 Gundogan ........... H01R 9/2475 174/112

8,426,733 B1 * 4/2013 Cunningham ........... H02G 3/32 174/112

8,434,249 B2 * 5/2013 Wieneke ................... G09F 3/06 24/16 PB

2004/0035029 A1 * 2/2004 Forsberg ................. G09F 3/205 40/316

FOREIGN PATENT DOCUMENTS

DE 10 2009 014 694 A1 10/2010

EP 1596472 B1 2/2008

FR 2 344 992 A1 10/1977

* cited by examiner

CONDUCTOR MARKER

REFERENCE TO RELATED APPLICATIONS

This application is a national stage application under 35 C.F.R. §371 of the PCT International Application No. PCT/EP2014/058189 filed Apr. 23, 2014, which claims priority of the German application No. DE 20 2013 101 786.8 filed Apr. 25, 2013.

BACKGROUND OF THE INVENTION

Field of the Invention

A conductor marker includes a pair of pivotally connected half sections that are operable from an open coplanar condition to a closed condition enclosing the electrical conductor, together with a non-skid arrangement that engages the peripheral surface of the conductor as the half sections are pivoted from the open condition toward the closed condition, thereby to prevent longitudinal displacement of the marker relative to the conductor.

Description of Related Art

From the German published application No. DE 10 2009 014 694 A1, it is known to provide a conductor marker for identifying electrical components. On the base body of the identification plate, a surface that can be labeled or a support element that can be labeled is arranged. Furthermore, the base body comprises latching elements, by means of which the identification plate can be slipped or clamped upon the electrical component, so that it is arranged between the latching elements.

In contrast, the European patent No. EP 1 596 472 A1 discloses a conductor marking sheath with receiving pockets into which the marking plates can be inserted.

Such conductor identification means share the feature that they are produced from a plastic by injection molding or extrusion, for example. In the process, a mat made of a plurality of such identification means is produced, from which the individual identification means can be detached at predetermined breaking point.

Also known are conductor markers that can be closed using a film hinge. Such conductor markers have two marker halves, of which at least one is provided for the labeling. An electrical conductor is arranged between the marker halves, and the marker halves are folded together so that they enclose the conductor. In the process, the marker halves are connected by latching means arranged on them.

The present invention was developed to provide an improved conductor marker having a film hinge, which is designed to be finger friendly and easy to handle.

SUMMARY OF THE INVENTION

Accordingly, a primary object of the present invention is to provide a conductor marker having a pair of pivotally connected half sections that are operable from an open coplanar condition to a closed condition enclosing the electrical conductor, together with a non-slide arrangement that engages the peripheral surface of the conductor as the half sections are pivoted from the open condition toward the closed condition, thereby to prevent longitudinal sliding of the marker relative to the conductor. Latching means serve to lock together the half sections when they are in the closed condition.

A more specific object of the invention is to provide a conductor marker having a marker body formed of a synthetic plastic material and including a pair of generally planar half sections normally arranged in an initial open condition in horizontal coplanar side-by-side relation, at least one of the half sections having an upper surface carrying labeling indicia; at least one integral film hinge device connecting together the adjacent side edges of the half sections, thereby to afford pivotal displacement of the half sections about a given pivot axis from said open position toward a closed condition enclosing the electrical conductor to be marked; and a non-skid arrangement arranged on said hinge device for non-skid engagement with the outer peripheral surface of the conductor as the half sections are pivotally displaced from the open condition to the closed condition, thereby to prevent longitudinal slipping of the marker body relative to the conductor.

According to another object, on the side of the conductor marker facing the conductor, a mounting aid is provided on said marker, as a result of which an electrical conductor inserted in the conductor marker does not slip during closing of the conductor marker. As a result, the handling of the conductor marker is facilitated, and the mounting of the conductor marker can be carried out very rapidly.

It is preferable to provide on the film hinge in each case a mounting aid on the two marker halves, so that the mounting aids are arranged symmetrically on the film hinge. Particularly preferable are mounting aids that are designed in each case as a bead-shaped molded projection. Due to this arrangement of the molded projections provided on the two sides of the film hinge, the electrical conductor is prevented from slipping off as it is being mounted. In addition, the electrical conductor is centered at least temporarily by the mounting aids in the conductor marker.

The molded projections are preferably produced so that they form one piece with the conductor marker. In this embodiment, the conductor marker can be produced very cost effectively.

It is preferable that the contours of the conductor marker have a curved design, so that the conductor marker can be handled in a finger-friendly manner.

BRIEF DESCRIPTION OF THE DRAWINGS

Other objects and advantages of the invention will become apparent from a study of the following specification, when viewed in the light of the accompanying drawing, in which:

FIGS. 4*c* and 4*c* are end and side perspective views, respectively, of the second embodiment when arranged in the fully closed and latched condition on an electrical conductor;

DETAILED DESCRIPTION OF THE INVENTION

Figure 1A:
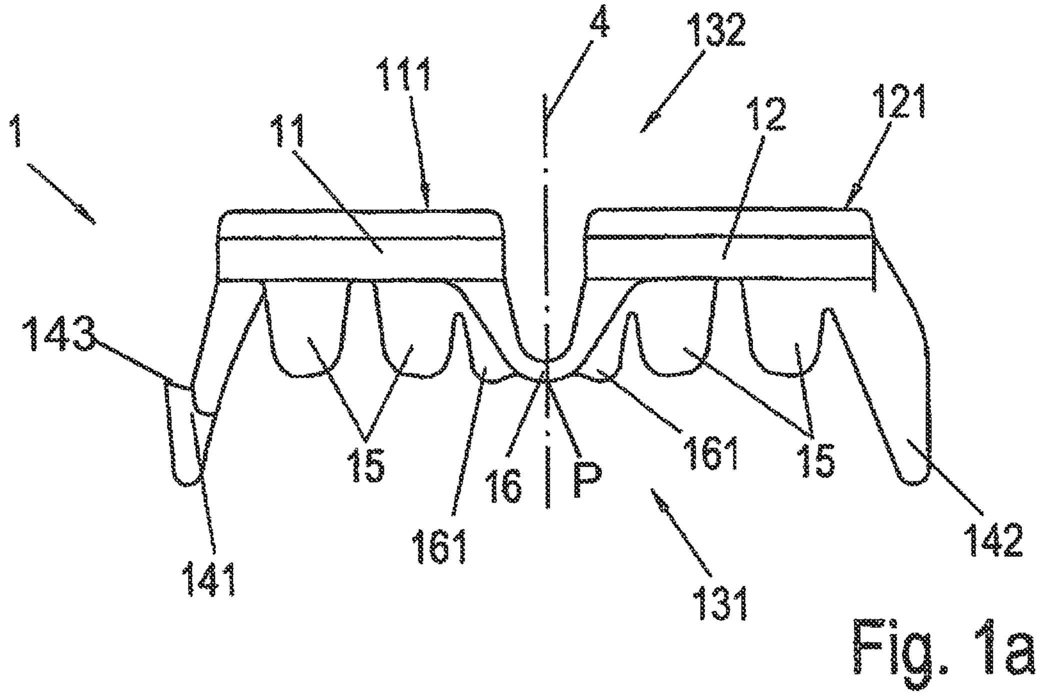
FIGS. 1*a* and 1*b* are end and bottom perspective views, respectively, of a conductor marker according to the present invention when in its normal open condition.
Figure 1B:
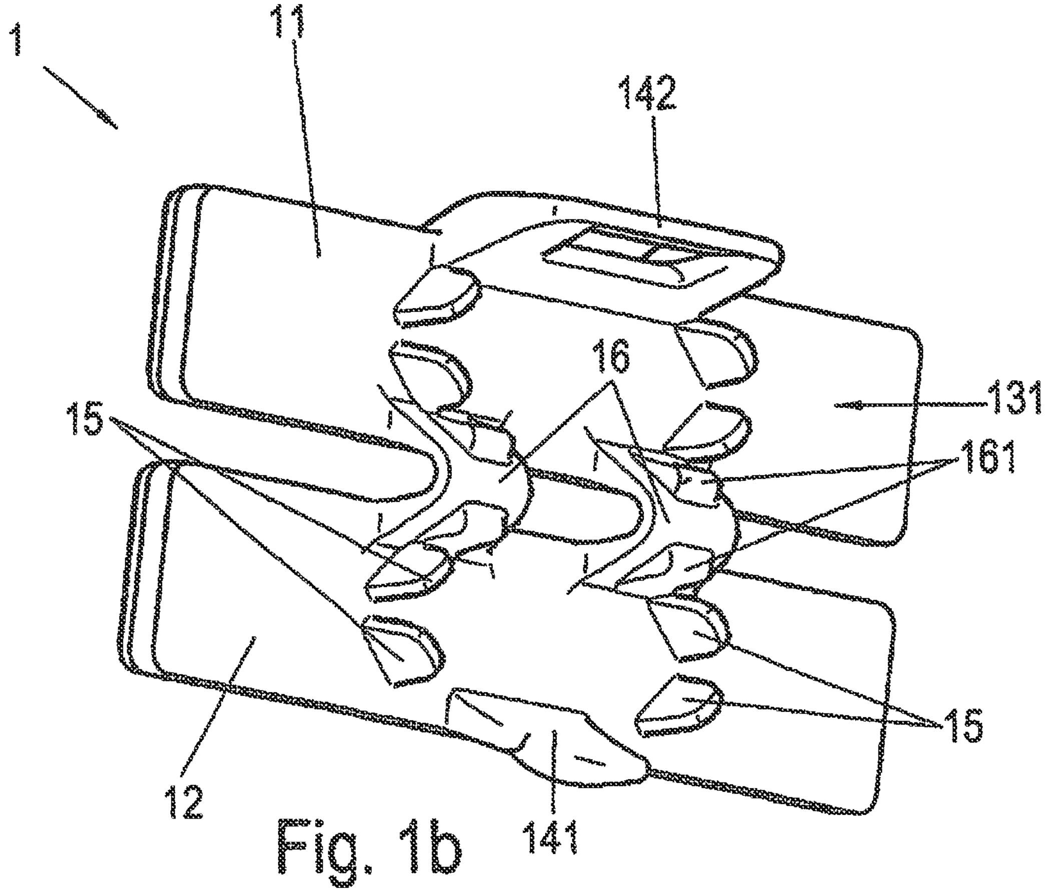

Referring first more particularly to FIGS. 1*a* and 1*b*, according to a first embodiment of the invention, the conductor marker includes a horizontal marker body 1 formed of synthetic plastic material and including a pair of relatively rigid half sections 11 and 12 joined by a pair of flexible film hinges 16 that define a pivot axis P contained in the vertical axis of symmetry 4. The lower surface 131 of the marker body is adapted to engage the peripheral surface of a conductor to be marked, and the upper surface 132 remains exposed when the marker body is mounted on the conductor. The generally planar upper surfaces 111 and 121 of the half sections define labeling surfaces for carrying indicia, such as labels. Latching means in the form of a downwardly extending latch projection 141 and an opposed companion latching element containing a latch opening 142 are provided at the remote side edges of the half sections, as shown in FIG. 1*b*. Arranged between these latching components is a diameter compensation arrangement in the form of a plurality of downwardly extending deformable tabs 15.

According to a characterizing feature of the invention, a pair of bead-shaped non-skid elements 161 are provided on the outer surfaces of the legs of the V-shaped film hinges, which non-skid elements have rounded lower extremities and aid in the mounting of the marker body onto an electrical conductor.

Thus, the conductor marker 1 has a first marker half 11 and a second marker half 12, which are connected to one another by two film hinges 16. However, a modification is also possible in which the marker halves are connected to one another by only one film hinge.

Here, a labeling surface 111, 121 is provided on at least one of the two marker halves 11, 12 on a side 132 of the conductor marker 1 facing away from the conductor. The labeling surface 111, 121 can either be labeled directly, or a labeling means (not shown) such as a label, for example, can be arranged on the labeling surface 111, 121.

Figure 1C:
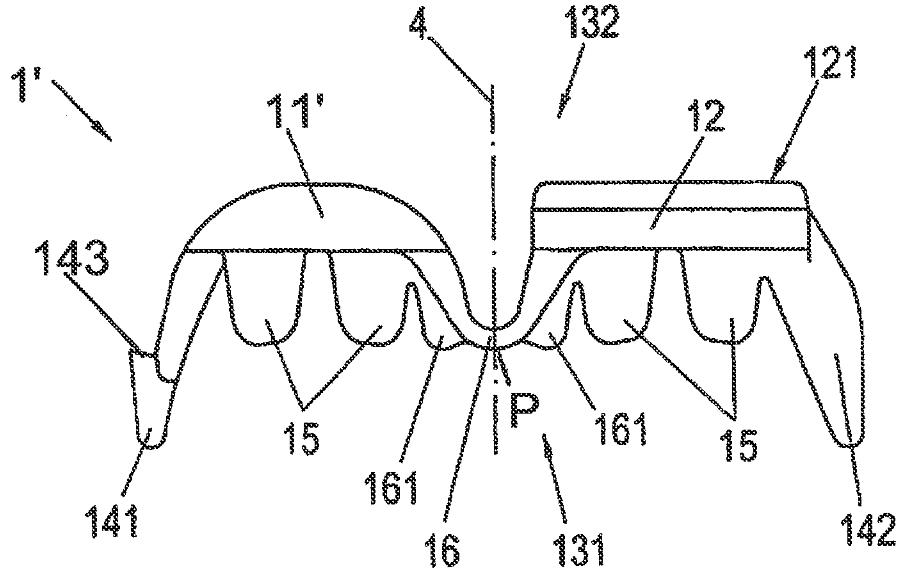
FIGS. 1*c* and 1*d* are end and bottom perspective views, respectively, of a second embodiment of the invention.
Figure 1D:
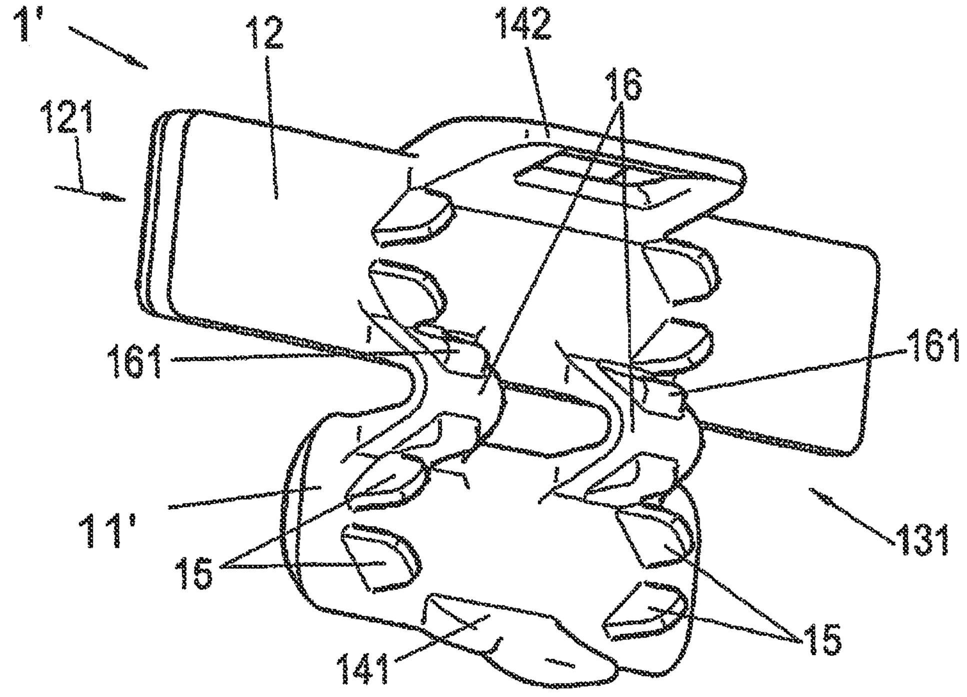

In the second embodiment of the invention shown in FIGS. 1*c* and 1*d*, the half section 11' of the marker body 1' has a rounded upper surface for assisting the user's fingers in closing the marker about the conductor. Accordingly, in this second embodiment, only one labeling surface 121 is provided.

Figure 3A:
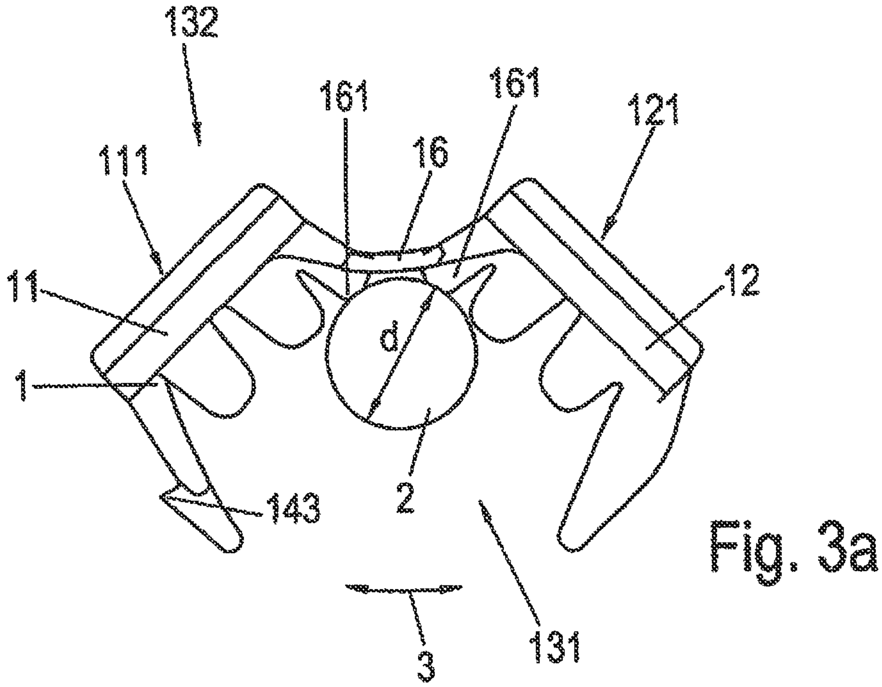
FIGS. 3*a* and 3*b* are end and bottom perspective views, respectively, of the first embodiment when arranged in a partially closed condition on an electrical conductor.
Figure 3B:
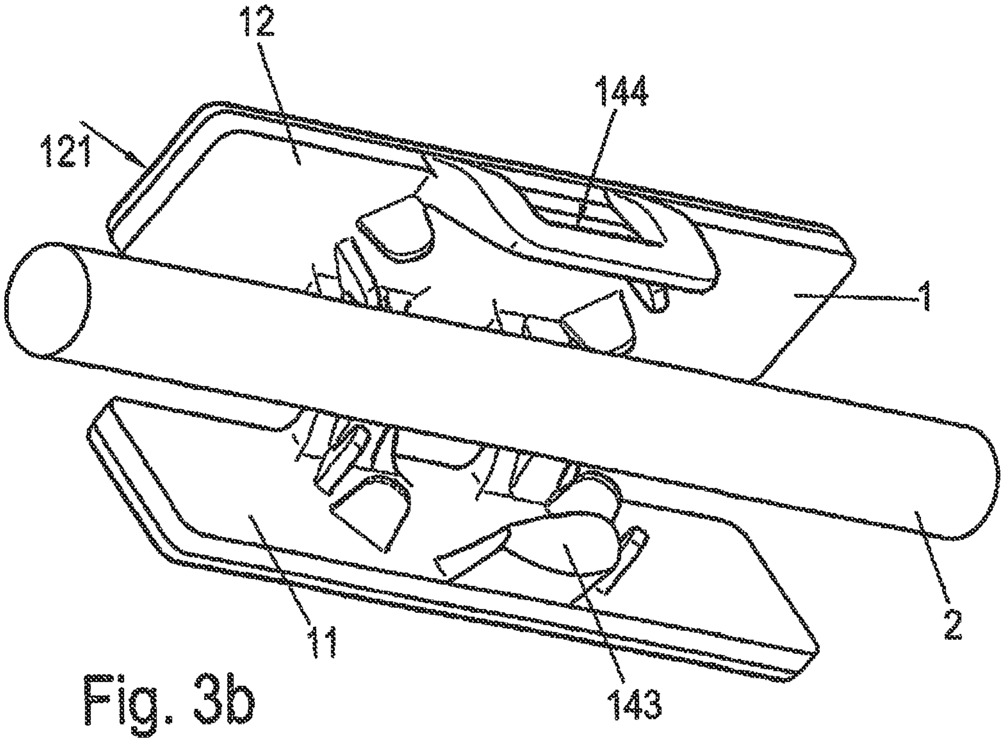

Referring to FIGS. 3*a* and 3*b*, to mount the first embodiment on a conductor 22, the marker body 1 is arranged above and parallel with the conductor 2, and the apex or pivot point P of the V-shaped film hinge 16 is seated on the periphery of the conductor having a diameter d. As the half sections 11 and 12 are initially pivoted downwardly upon the conductor, the rounded extremities of the non-skid elements 161 are brought into frictional engagement with the outer periphery of the conductor 2, thereby to prevent longitudinal displacement of the marker body relative to the conductor. As the half sections 11 and 12 are further pivoted toward the closed and latched condition of FIGS. 4*a* and 4*b*, the half sections are pivoted about the rounded extremities of the non-skid elements 161, and the diameter compensating tabs 15 are deformed to correspond with the diameter d of the conductor.

Figure 4A:
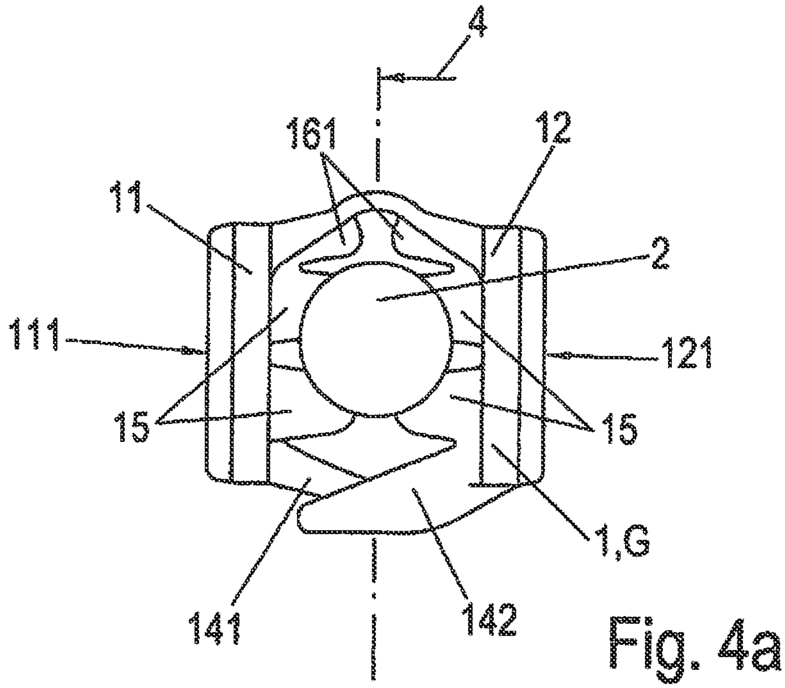
FIGS. 4*c* and 4*d* are end and side perspective views, respectively, of the second embodiment when arranged in the fully closed and latched condition on an electrical conductor.
Figure 4B:
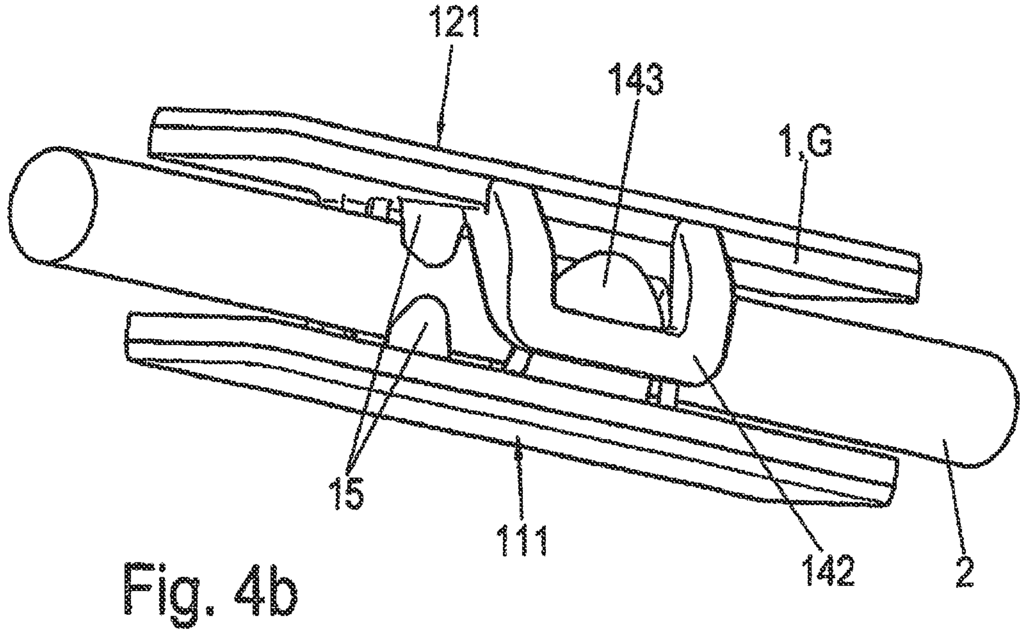

When the half sections 11 and 12 are displaced to the fully closed condition shown in FIGS. 4*a* and 4*b*, the compensation tabs 15 are deformed to correspond with the conductor diameter, and the latch 143 is latched within the opening 142. As shown in FIG. 4*a*, when the conductor marker is in the fully closed latched condition, the hinge element 16 is so deformed that the non-skid elements 161 no longer are in engagement with the outer peripheral surface of the conductor, and the deformed tabs 15 prevent longitudinal displacement of the marker relative to the conductor.

Figure 2A:
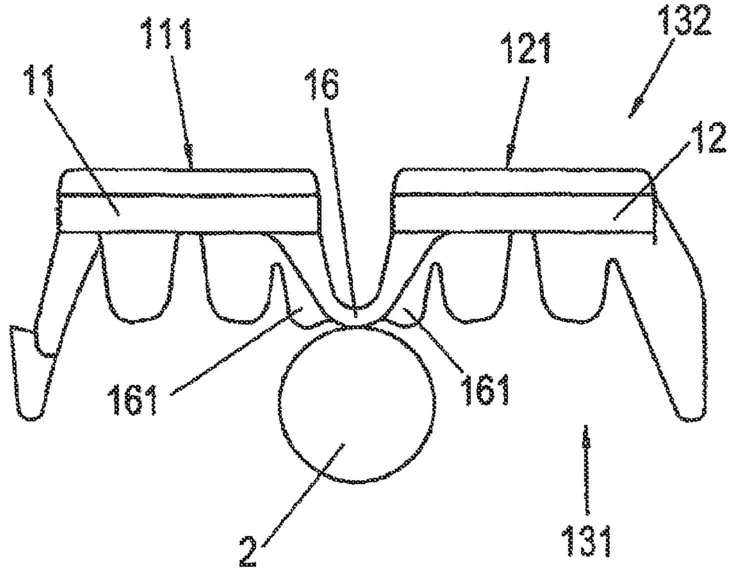
FIGS. 2*a* and 2*b* are end and bottom perspective views, respectively, of the first embodiment when arranged in the open condition arranged on an electrical conductor.
Figure 2B:
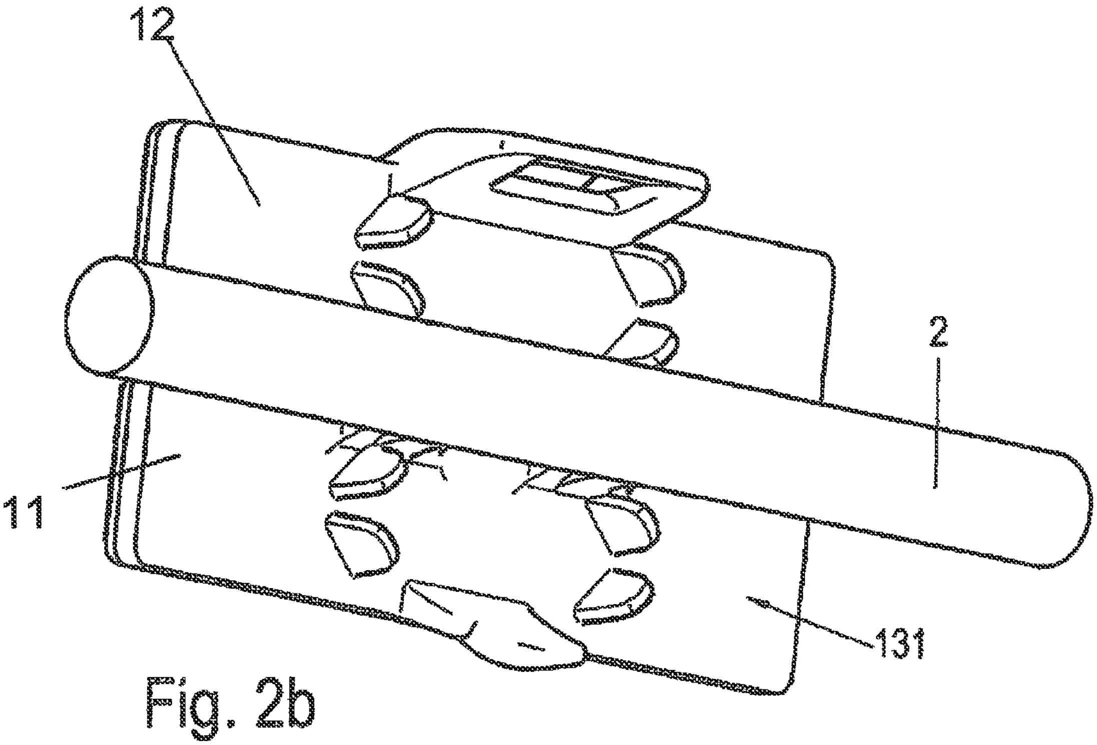
Figure 2C:
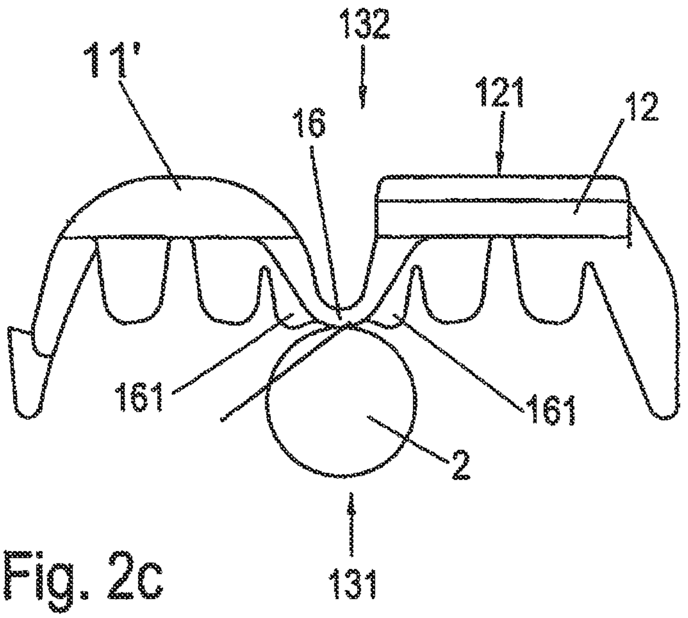
FIGS. 2*c* and 2*d* are end and bottom perspective views, respectively, of the second embodiment when arranged in the open condition arranged on an electrical conductor.
Figure 2D:
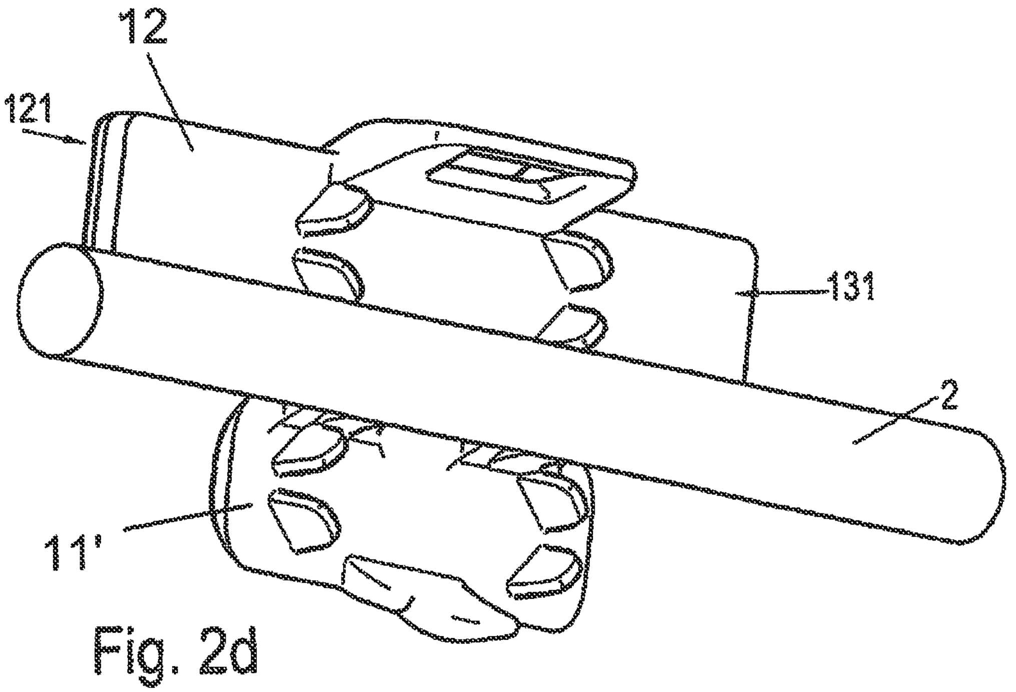
Figure 3C:
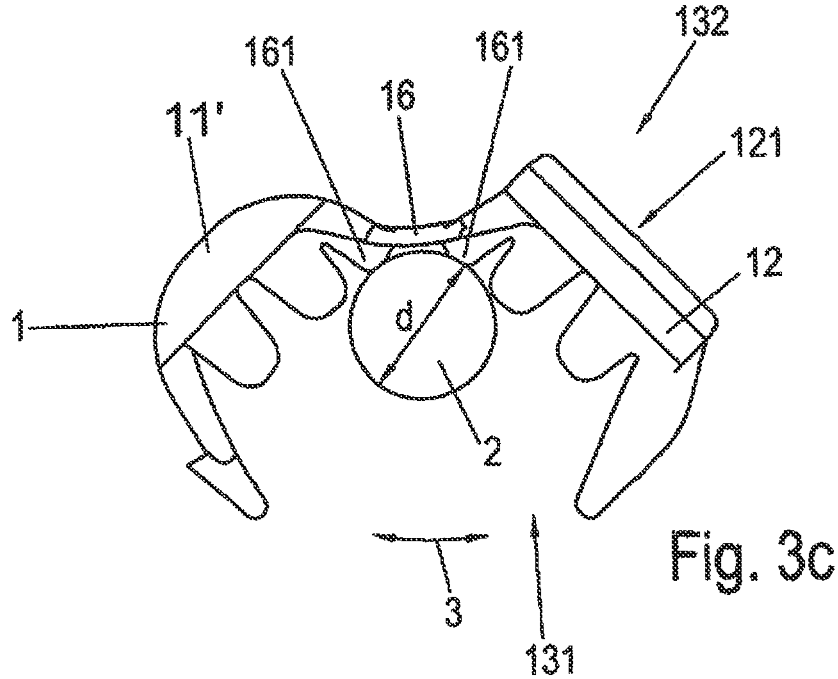
FIGS. 3*c* and 3*d* are end and bottom perspective views, respectively, of the second embodiment when arranged in a partially closed condition on an electrical conductor.
Figure 3D:
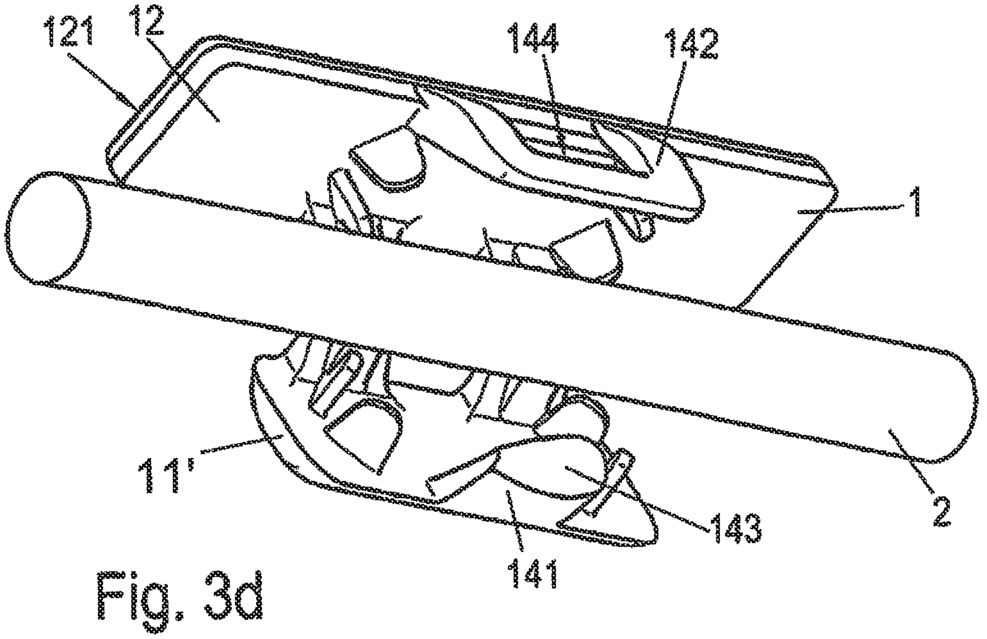
Figure 4C:
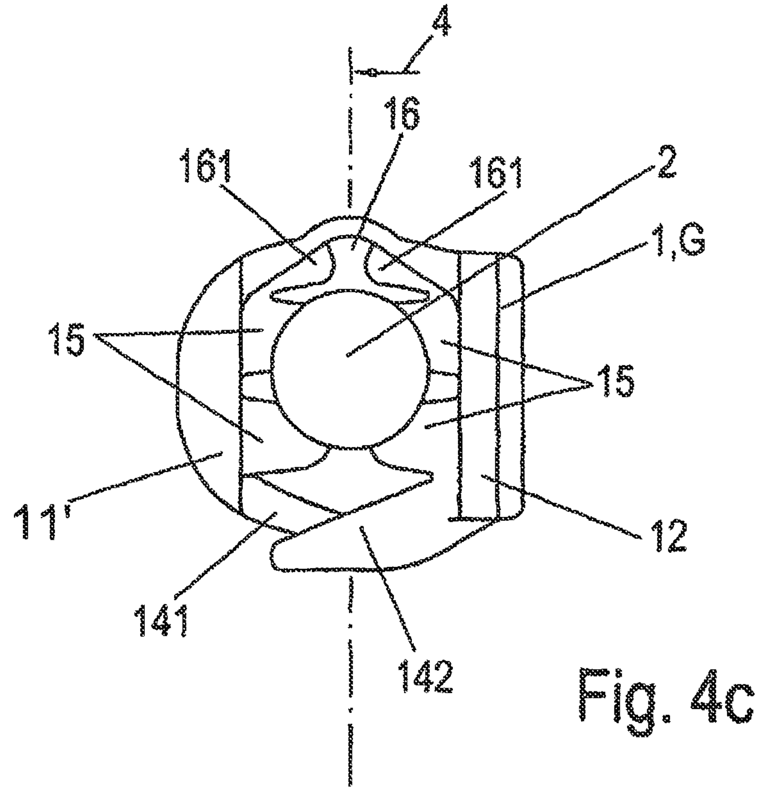
Figure 4D:
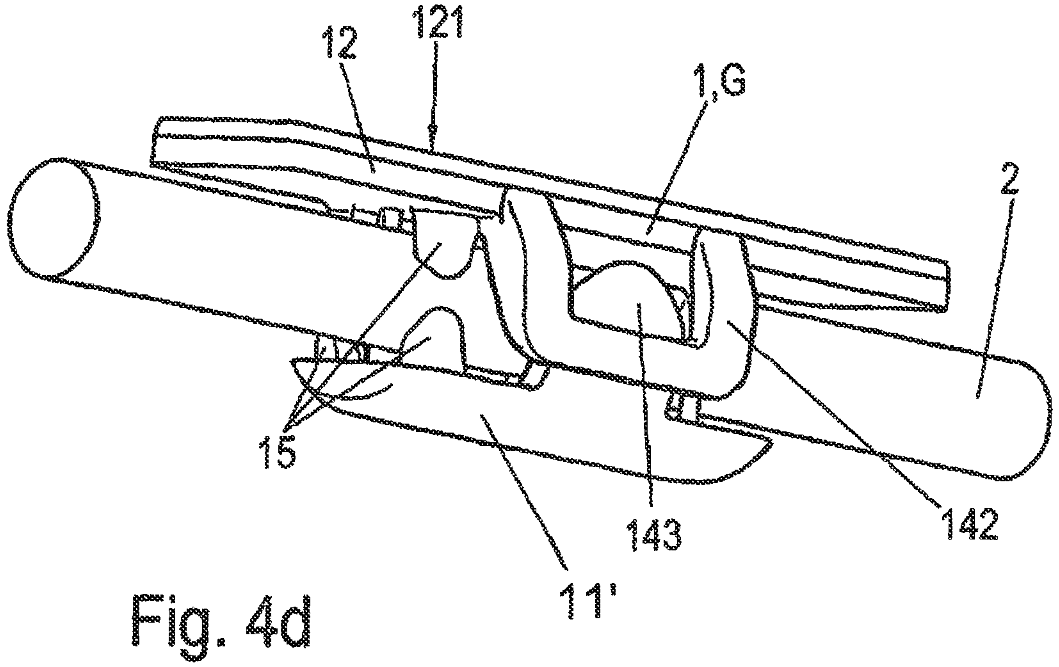

Similarly, for the second embodiment, the hinge apex is seated upon the conductor periphery as shown in FIGS. 2*c* and 2*d*, the half sections 11' and 12 are pivoted downwardly with the non-skid elements 161 in frictional engagement with the conductor (FIGS. 3*c* and 3*d*) as the half sections are pivoted toward the latched and closed condition (FIGS. 4*c* and 4*d*).

The mounting aid non-skid element 161 is a molded projection. The molded projection here has a bead-shaped design. Below, the terms mounting aid and molded projection are used synonymously.

During the closing of the conductor marker 1, the molded projections 161 are at least temporarily in contact with the electrical conductor 2 arranged on the side 132 facing the conductor. As a result, the electrical conductor 2 does not slip off during the mounting. Thus, the electrical conductor 2 is easier to mount.

In order to be able to use electrical conductors 2 having different conductor diameters d, on the side 131 facing the conductor, on each marker half 11, 12, at least one compensation tab 15—here two compensation means tabs 15—is provided in each case. The compensation tabs here are designed as a tongue, which is arranged particularly advantageously transversely to the labeling surface 111, 121. Other orientations (longitudinal/diagonal) would also be conceivable. In the case of closing of the conductor marker 1, the tabs 15 are deformed during the closing of the conductor marker 1, if the diameter d of the electrical conductor 2 is greater than a clearance (not marked) that remains between the compensation tab 15 in the closed state G of the conductor marker 1.

In order to keep the marker halves 11, 12 connected to one another after the closing of the conductor marker 1, on the first marker half 11, a latching means 141 is provided, and, on the second marker half 12, a counter latching means 142 is provided. The latching means 141 here is designed as a latching tongue which has a ledge 143. The counter latching means 142 is designed as a stirrup piece which has an opening 144. The terms latching means 141 and latching tongue as well as counter latching means 141 and stirrup pieces are used synonymously below.

Figure 5A:
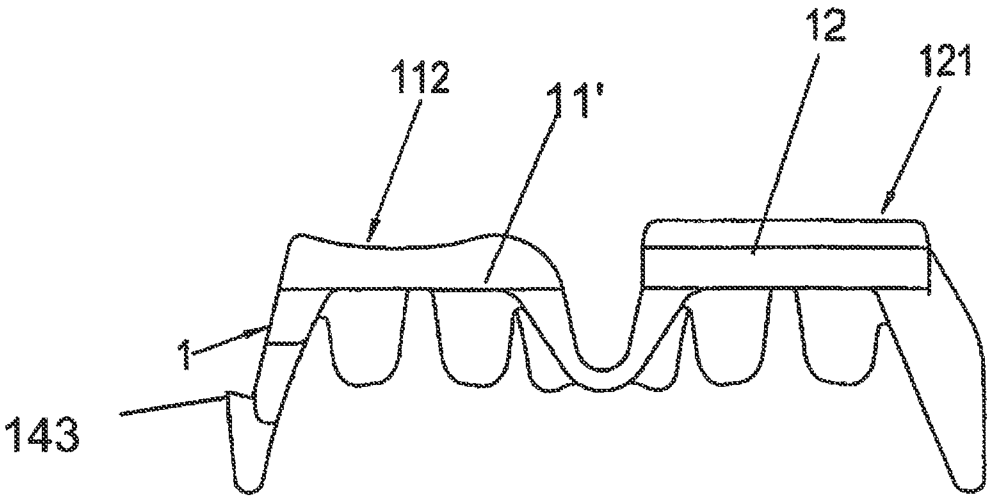
FIGS. 5*a* and 5*b* are end and top perspective views, respectively, of a first modification of the second embodiment of the invention when in the open condition.
Figure 5B:
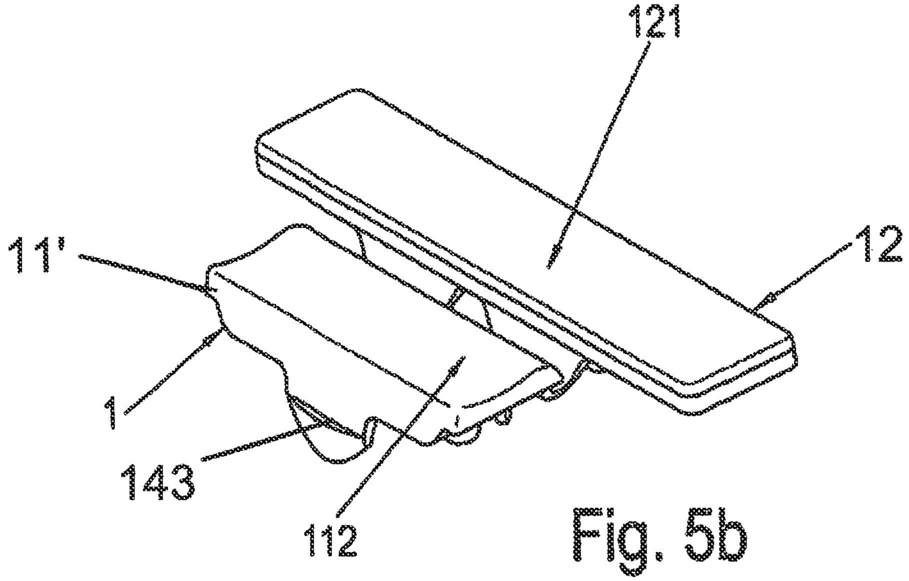
Figure 6A:
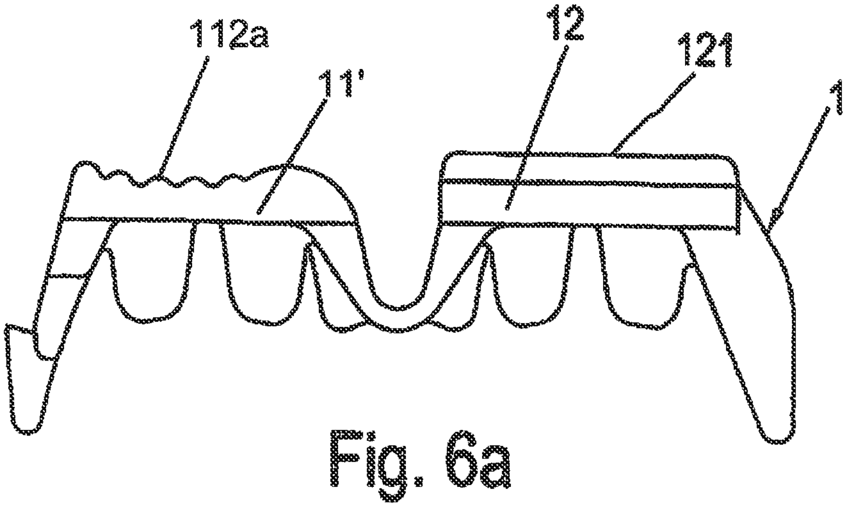
FIGS. 6*a* and 6*b* are end and top perspective views, respectively, of a second modification of the second embodiment of the invention when in the open condition.
Figure 6B:
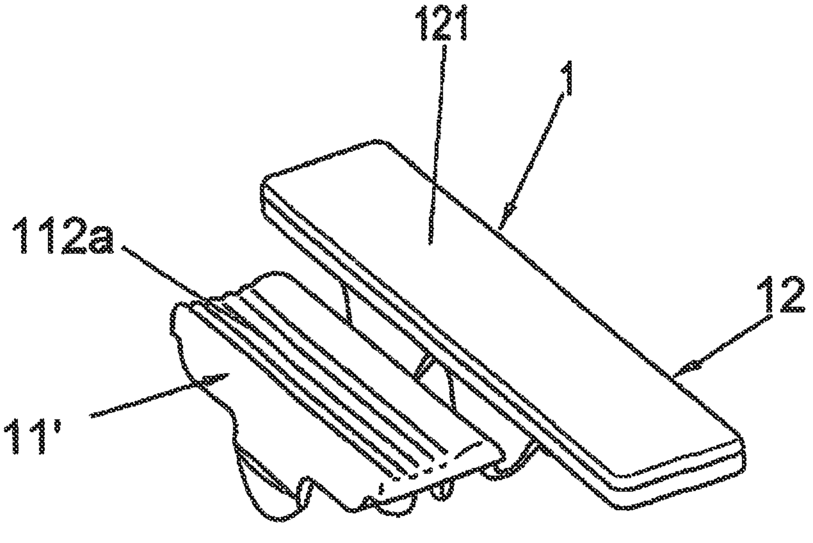

Referring now to FIGS. 5*a* and 5*b*, in the second embodiment, the upper surface 112 of the second half section may be profiled—for example, by a recess—to provide a finger gripping surface. As shown in FIGS. 6*a* and 6*b*, this finger gripping surface 112' may be knurled.

Figure 7A:
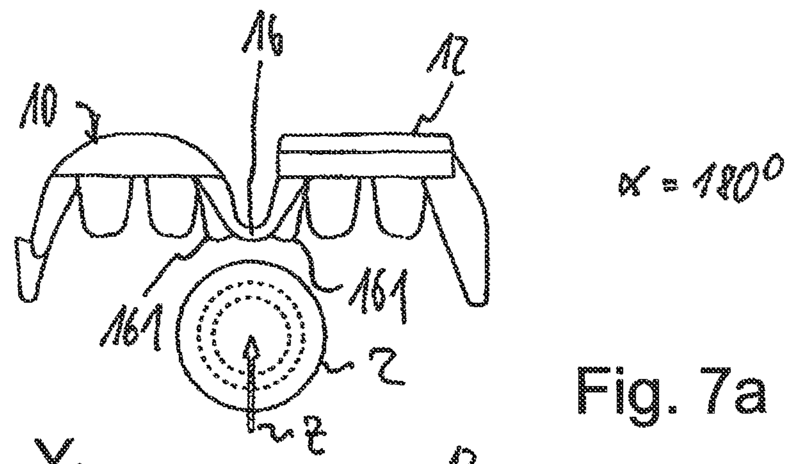
FIGS. 7*a*-7*f* are end views illustrating six initial steps for displacing the half sections of the second embodiment from the open condition toward the closed condition relative to a conductor having a relatively large diameter.
Figure 7B:
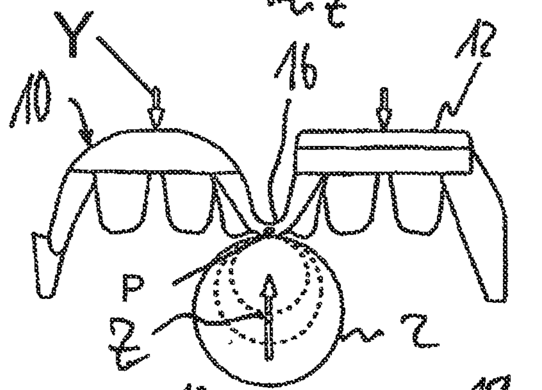
Figure 7C:
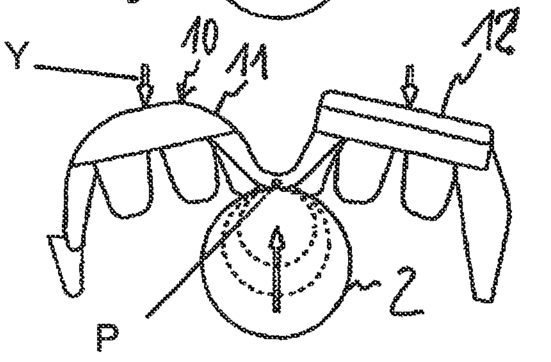
Figure 7D:
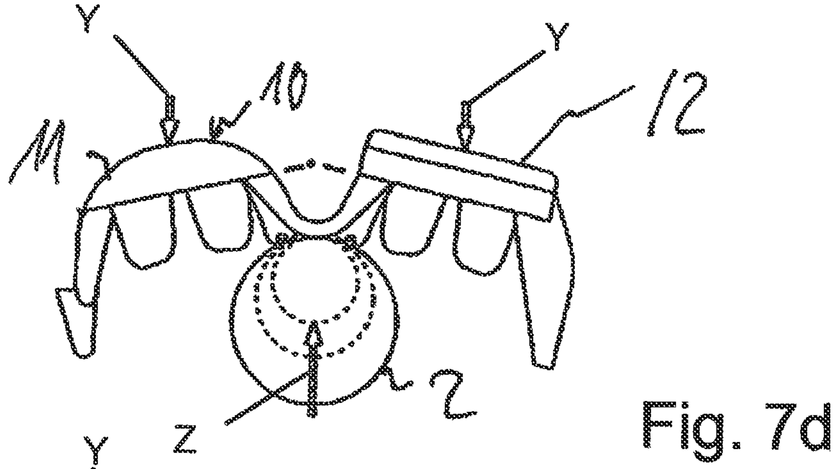
Figure 7E:
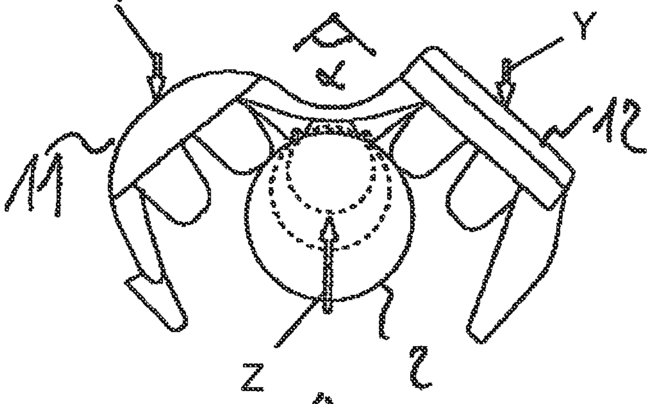
Figure 7F:
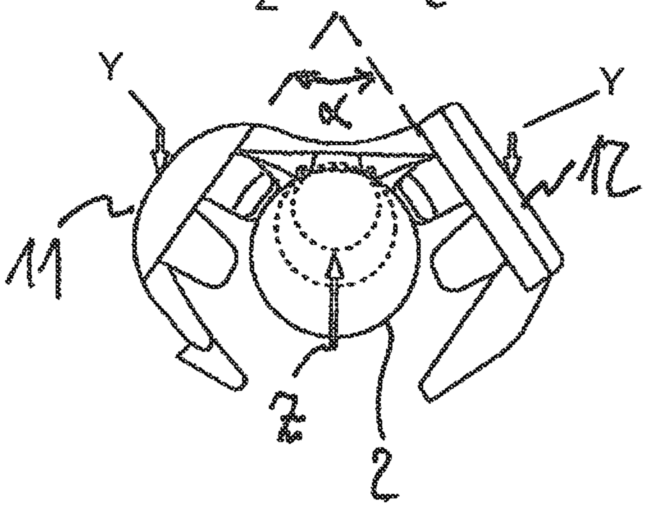
Figure 8A:
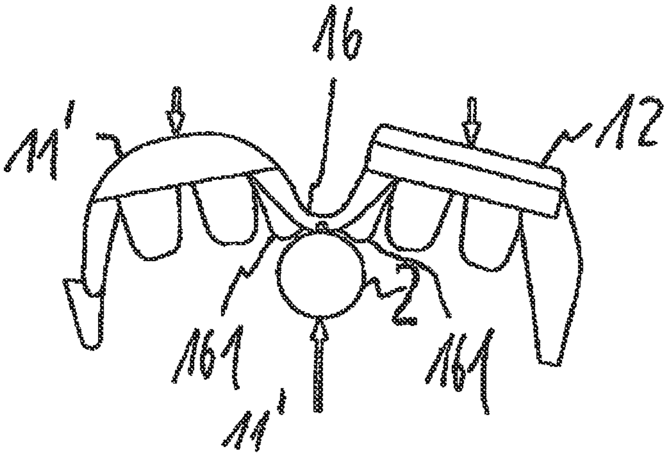
FIGS. 8*a*-8*c* are end views illustrating three initial steps during the mounting of the second embodiment on a conductor having a relatively small diameter.
Figure 8B:
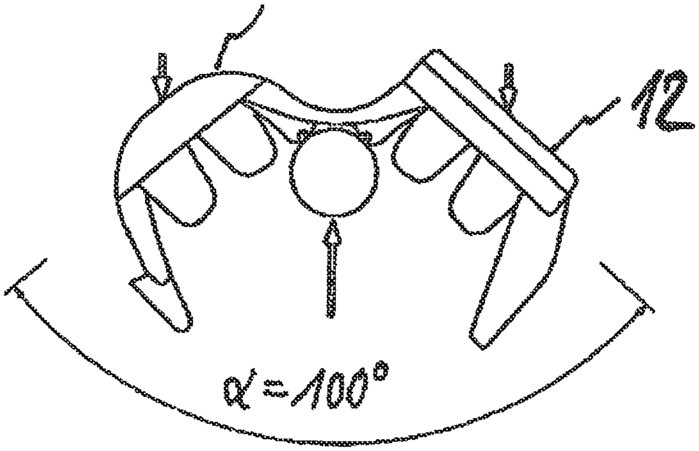
Figure 8C:
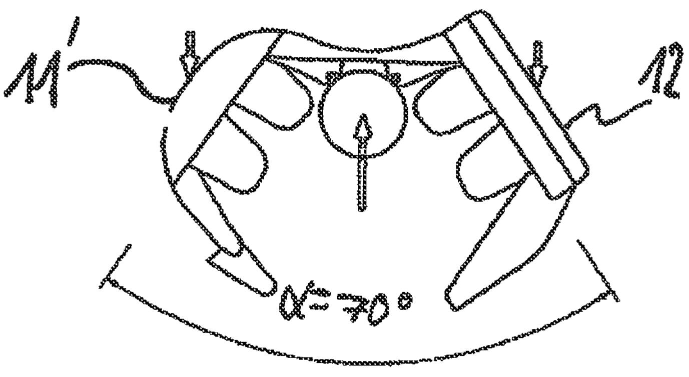

FIGS. 7*a*-7*f* illustrate the attachment steps for mounting the second embodiment of the marker on a conductor 2 having a first diameter close to or at Dmax, and FIGS. 8*a*-8*c* illustrate the attachment of the second embodiment of a conductor marker on a conductor 2 having a second diameter close to or at Dmin.

After the placement of the components according to FIGS. 7*a* and 7*b*, the conductor 2 briefly contacts the film hinge 16 (a contact is indicated in each case by a black dot in FIGS. 7 and 8). The opening angle α between the two marker halves 11', 12 is 180° here. One can clearly see that the two mounting aids 161 formed as protrusions are designed in such a manner that any conductor 2 whose diameter range is in a diameter range suitable for the marker, between a minimum diameter and a maximum diameter (Dmin, Dmax), contacts the conductor marker halves immediately during the closing of the conductor marker, or after sweeping over a minimum closing angle of "180°—opening angle α," where preferably α=150° at most, from the position in which the conductor marker halves preferably enclose an opening angle of 180° (transition from FIG. 7*c* to FIG. 7*d*).

Then, over a relatively large closing angular range, in each case, the radius of the mounting aids 161 at the free ends of the protrusion-like mounting aids 161 facing the conductor 2 functions as a pivot bearing or a pivot pin and thus as a rotation aid on which the conductor marker halves 11' and 12 rotate along the outer periphery of the conductor 2 during the closing (FIGS. 7*e* and 7*f*).

Preferably, on the free ends of the mounting aids 161 which are formed as radius, the marker halves 11', 12 rotate, from the first contact on the conductor 2 over an angular range of more than 60°, in particular up to an opening angle α of 90°, which the marker halves 11', 12 enclose, or more in the case of closing outside on the conductor 2.

In FIGS. 8*a*-8*c*, the angle over which the marker halves 11', 12 rotate on the free ends of the mounting aids 161, which are formed as radii on the outer surface of the conductor 2, is even greater than in FIG. 7, since the conductor 2 in FIG. 8 has a smaller diameter than in FIG. 7.

In each case, it is ensured that, during the closing of the conductor marker 1, the conductor 2 is in contact with the radii of the ends of the mounting aids 161 formed as protrusions, at least over an angular range of more than 60°, in particular more than 80°, preferably at least to a remaining opening angle α of 90° still enclosed by the marker halves 11', 12, or more during the closing, so that the marker can be closed particularly easily and cannot become wedged on sharp edges.

Finally, during the closing of the conductor marker 1, the edge 143 of the latching tongue 141 again arrives in the opening edge 144, and thus is latched to the stirrup piece 142 with which it engages.

The conductors 2 having the admissible diameter between Dmin and Dmax are thus not, or substantially not, pushed away from the marker during the closing (indicated by the arrow Z corresponding to the feed direction of the conductor 2). The small arrows on the marker halves 11', 12 indicate their force-motion arrows. One can see that, at the time of the placement on and the closing of the conductor marker 1, the force-motion arrows of the conductor 2 and of the marker halves 11', 12 extend in mutually opposite directions around a conductor 2, preferably over a closing angle of more than 90°, in particular more than 130°, particularly preferably over the entire closing angle up to the latching of the two marker halves 11', 12 to one another, which allows a particularly easy closing process.

While in accordance with the provisions of the Patent Statutes the preferred forms and embodiments of the invention have been illustrated and described, it will be apparent to those skilled in the art that changes may be made without deviating from the invention described above.

The invention claimed is:

1. A connector marker for identifying an electrical conductor, comprising:

a marker body formed of a synthetic plastic material including:

(a) a pair of generally planar half sections normally arranged in an initial open condition in horizontal coplanar side-by-side relation, said half sections having adjacent side edges, at least one of said half sections having an upper surface adapted to carry labeling indicia, said half sections having lower surfaces;

(b) at least one integral film hinge device connecting together said half section lower surfaces adjacent said side edges, thereby to afford pivotal displacement of said half sections about a given pivot axis from said open condition toward a closed condition enclosing the electrical conductor to be marked; and (c) at least two non-skid elements extending from opposite sides of said hinge device, respectively, and having a rounded extremity for non-skid engagement with an outer peripheral surface of the conductor as said half sections are pivotally displaced from said open condition to said closed condition, thereby to prevent longitudinal slipping of the marker body relative to the conductor.

2. The connector marker defined in claim 1, wherein said film hinge device is initially generally V-shaped and includes a pair of upwardly divergent legs having outer surfaces from which said non-skid elements extend, respectively.

3. The connector marker defined in claim 2, wherein said non-skid elements are in engagement with the outer peripheral surface of the conductor during at least the first 60° of angular displacement of said half sections from said open condition toward said closed condition.

4. The connector marker defined in claim 2, wherein said non-skid elements are in engagement with the outer peripheral surface of the conductor during at least the first 90° of angular displacement of said half sections from said open condition toward said closed condition.

5. The connector marker defined in claim 4, wherein during the angular displacement of the half sections from the open condition through an angle beyond about 30° toward the closed condition, the rounded extremities of the non-skid elements serve as pivot points about which the half sections pivot relative to the conductor.

6. The connector marker defined in claim 2, wherein for a given conductor diameter near the lower end of the diameter range of between Dmin and Dmax, the half section closing forces are less than the opposing conductor force during pivotal motion of the half sections from the fully open condition through an angle of about 90° toward a partially closed condition, whereby the conductor is not pushed away from the conductor marker body, resulting in an easy closing process.

7. The connector marker defined in claim 1, wherein said half sections are relatively rigid; and further including:

(d) a diameter compensating assembly connected with the lower surfaces of said half sections for engagement with the outer peripheral surface of the conductor, said diameter compensating assembly being operable to compensate for conductor diameters of different sizes.

8. The connector marker defined in claim 7, wherein said diameter compensating assembly includes a plurality of deformable tabs that are integral with and extend downwardly from the lower surfaces of said half sections for engagement with the outer peripheral surface of the conductor.

9. The connector marker defined in claim 8, wherein said deformable tabs are arranged generally normal to a longitudinal axis of the associated half section.

10. The connector marker defined in claim 1, wherein the upper surface of one of said half sections is formed to serve as a gripping surface, the upper surface of the other half section serving as an indicia-bearing labeling surface.

11. The connector marker defined in claim 10, wherein said gripping surface is knurled.

12. The connector marker defined in claim 1, and further including a latch assembly arranged on the remote side edges of said half sections for latching said half sections together when said half sections are in said closed condition.

13. The connector marker defined in claim 1, wherein said marker body includes at least two film hinge devices connected in spaced relation between said adjacent half section side edges, each of said film hinge devices including a pair of said non-skid elements arranged on opposite sides of said pivot axis.

* * * * *